(12) United States Patent
Kim et al.

(10) Patent No.: US 10,344,834 B2
(45) Date of Patent: *Jul. 9, 2019

(54) PLANETARY GEAR TRAIN OF AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Jin Ho Kim, Suwon-si (KR); Dong Hwan Hwang, Seoul (KR); Jong Sool Park, Hwaseong-si (KR); Jong Soo Kim, Seoul (KR); Kyeong Hun Lee, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/825,941

(22) Filed: Nov. 29, 2017

(65) Prior Publication Data

US 2018/0328467 A1 Nov. 15, 2018

(30) Foreign Application Priority Data

May 10, 2017 (KR) .................. 10-2017-0058313

(51) Int. Cl.
*F16H 3/66* (2006.01)
(52) U.S. Cl.
CPC ....... *F16H 3/66* (2013.01); *F16H 2200/0069* (2013.01); *F16H 2200/2015* (2013.01); *F16H 2200/2046* (2013.01)

(58) Field of Classification Search
None
See application file for complete search history.

(56) References Cited

U.S. PATENT DOCUMENTS

| 2014/0004991 | A1* | 1/2014 | Koch | F16H 3/66 475/276 |
| 2014/0038765 | A1* | 2/2014 | Koch | F16H 3/66 475/276 |
| 2014/0038766 | A1* | 2/2014 | Koch | F16H 3/66 475/276 |
| 2016/0169339 | A1* | 6/2016 | Cho | F16H 3/66 475/275 |
| 2016/0169350 | A1* | 6/2016 | Park | F16H 3/666 475/275 |

(Continued)

*Primary Examiner* — Justin Holmes
(74) *Attorney, Agent, or Firm* — Brinks Gilson & Lione

(57) ABSTRACT

A planetary gear train of an automatic transmission for a vehicle is disclosed. The planetary gear train may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; and a fifth planetary gear set including thirteenth, fourteenth, and fifteenth rotational elements. The planetary gear train improves power delivery performance and fuel economy of a vehicle by achieving ten forward speed stages and one reverse stage.

18 Claims, 3 Drawing Sheets

(56) References Cited

U.S. PATENT DOCUMENTS

2016/0169352 A1\* 6/2016 Lee .................. F16H 3/666
                                                                             475/275
2018/0328456 A1\* 11/2018 Kim .................. F16H 3/62
2018/0328469 A1\* 11/2018 Kim .................. F16H 3/663

\* cited by examiner

FIG. 2

| speed stages | engaging elements | | | | | | gear ratio | step ratio | note |
|---|---|---|---|---|---|---|---|---|---|
| | C1 | C2 | C3 | B1 | B2 | B3 | | | |
| D1 | | | ● | ● | | ● | 6.69 | | gear ratio span : 10.9 ratio of R/D1 : 0.87 |
| D2 | | ● | | ● | | ● | 4.25 | 1.574 | |
| D3 | | ● | | | ● | ● | 3.14 | 1.354 | |
| D4 | | ● | ● | | | ● | 2.117 | 1.483 | |
| D5 | ● | ● | | | | ● | 1.625 | 1.303 | |
| D6 | ● | | ● | | | ● | 1.304 | 1.246 | |
| D7 | ● | ● | ● | | | | 1.00 | 1.304 | |
| D8 | ● | | ● | | ● | | 0.858 | 1.166 | |
| D9 | ● | ● | | | ● | | 0.708 | 1.212 | |
| D10 | ● | ● | | ● | | | 0.611 | 1.159 | |
| REV1 | ● | | | ● | | ● | -5.803 | - | |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2017-0058313, filed on May 10, 2017, which is incorporated herein by reference in its entirety.

FIELD

The present disclosure relates to a planetary gear train of an automatic transmission for a vehicle to improve power delivery performance and reduce fuel consumption.

BACKGROUND

The statements in this section merely provide background information related to the present disclosure and may not constitute prior art.

Generally, an automatic transmission achieving more speed stages has been developed to enhance fuel efficiency and provide better drivability.

Such an automatic transmission achieving more speed stages allows improvement to power performance and driving efficiency when downsizing an engine. Providing high efficiency multiple-speeds transmissions with smooth step ratios that can be used as an index closely related to drivability such as acceleration before and after a shift increases secure competitiveness of an automatic transmission in the automotive field.

In the automatic transmission, however, as the number of speed stages is increased, the number of internal components is typically increased. This negatively affects mountability, cost, weight and transmission efficiency.

Accordingly, development of a planetary gear train that improves efficiency with a small number of components may be provided in order to increase a fuel efficiency enhancement effect through the multiple-speeds.

Recently, an eight-speed automatic transmission has been introduced and a planetary gear train for an automatic transmission enabling more shift-stages has been developed.

However, since a conventional eight-speed automatic transmission has gear ratio span of 6.5-7.5 (gear ratio span is an important factor for securing linearity of step ratios), improvement of power performance and fuel efficiency may be minimal.

In addition, if an eight-speed automatic transmission has gear ratio span larger than 9.0, we have discovered that it is difficult to secure linearity of step ratios. Therefore, driving efficiency of an engine and drivability of a vehicle may be deteriorated.

The above information disclosed in this Background section is only for enhancement of understanding of the background of the present disclosure, and therefore it may contain information that does not form the prior art that is already known to a person of ordinary skill in the art.

SUMMARY

The present disclosure provides a planetary gear train of an automatic transmission for a vehicle having capable of improving power delivery performance and fuel economy by achieving ten forward speed stages and one reverse speed stage and reducing drag loss of clutches and brakes using five planetary gear sets and six engaging elements.

Another form of the present disclosure provides a planetary gear train of an automatic transmission for a vehicle having further capability of improving torque delivery efficiency and durability by using a planetary gear set of an output side in torque parallel type and reducing torque share of each planetary gear set and each engaging element.

Yet another form of the present disclosure provides a high-efficiency planetary gear train of an automatic transmission for a vehicle that increases flexibility of output gear ratios and improves linearity of step ratios by using five planetary gear sets for achieving ten forward speed stages and one reverse speed stage.

A planetary gear train of an automatic transmission for a vehicle according to an exemplary form of the present disclosure may include: an input shaft configured to receive torque of an engine; an output shaft configured to output torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a fifth planetary gear set including thirteenth, fourteenth, and fifteenth rotational elements; a first shaft fixedly connected to the first rotation element and the input shaft; a second shaft fixedly connected to the fourteenth rotation element and the output shaft; a third shaft fixedly connected to the fifth rotation element, the eighth rotation element, and the thirteenth rotation element; a fourth shaft fixedly connected to the eleventh rotation element and the fifteenth rotation element; a fifth shaft fixedly connected to the sixth rotation element; a sixth shaft fixedly connected to the ninth rotation element; a seventh shaft fixedly connected to the second rotation element and the fourth rotation element; an eighth shaft fixedly connected to the third rotation element, the seventh rotation element, and the tenth rotation element; and a ninth shaft fixedly connected to the twelfth rotation element.

The planetary gear train may further include: six engaging elements configured to selectively connect one shaft of nine shafts with another shaft of the nine shafts or selectively connect at least one shaft of nine shafts with a transmission housing, wherein any one of forward speed stages or a reverse speed stage is achieved by operating any three combinations of the six engaging elements.

The six engaging elements may include: three clutches, each connecting any two shafts among the nine shafts; and three brakes, each selectively connecting at least one shaft among the nine shafts that is not connected to the input shaft or the output shaft to the transmission housing.

The six engaging elements may include: a first clutch disposed between the second shaft and the sixth shaft; a second clutch disposed between the first shaft and the third shaft; a third clutch disposed between the first shaft and the fifth shaft; a first brake disposed between the seventh shaft and the transmission housing; a second brake disposed between the eighth shaft and the transmission housing; and a third brake disposed between the ninth shaft and the transmission housing.

The first rotation element is a first sun gear, the second rotation element is a first planet carrier, and the third rotation element is a first ring gear. The fourth rotation element is a second sun gear, the fifth rotation element is a second planet carrier, and the sixth rotation element is a second ring gear. The seventh rotation element is a third sun gear, the eighth rotation element is a third planet carrier, and the ninth rotation element is a third ring gear. The tenth rotation element is a fourth sun gear, the eleventh rotation element is a fourth planet carrier, and the twelfth rotation element is a fourth ring gear. The thirteenth rotation element is a fifth sun gear, the fourteenth rotation element is a fifth planet carrier, and the fifteenth rotation element is a fifth ring gear.

In one aspect, the first, second, third, fourth, and fifth planetary gear sets are disposed in a sequence of the first, second, third, fourth, and fifth planetary gear sets from the engine side. In another aspect, the first, second, third, fourth, and fifth planetary gear sets are disposed in a sequence of the first, third, second, fourth, and fifth planetary gear sets from the engine side.

According to exemplary forms of the present disclosure, ten forward speed stages and one reverse speed stage may be achieved by combining five planetary gear sets being simple planetary gear sets with six engaging elements.

In addition, since gear ratio span greater than 10.9 is secured, driving efficiency of the engine may be increased. In addition, since linearity of step ratios can be secured due to multiple speed stages, drivability such as acceleration before and after shift, rhythmical engine speed, and so on may be improved.

In addition, since ten forward speed stages and one reverse speed stages are achieved by using five planetary gear sets but the number of engaging elements is reduced, drag loss of clutches and brakes may be reduced and power delivery efficiency and fuel economy may be improved.

In addition, since a planetary gear set of an output side in torque parallel type is used and torque is evenly shared to each planetary gear set and each engaging element, torque delivery efficiency and durability may be improved.

In addition, since five planetary gear sets are used to achieve ten forward speed stages and one reverse speed stage, flexibility of output gear ratios may be increased and linearity of step ratios may be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operation chart of engaging elements at each speed stage in the planetary gear train according to the first exemplary form of the present disclosure.

Figure 1:
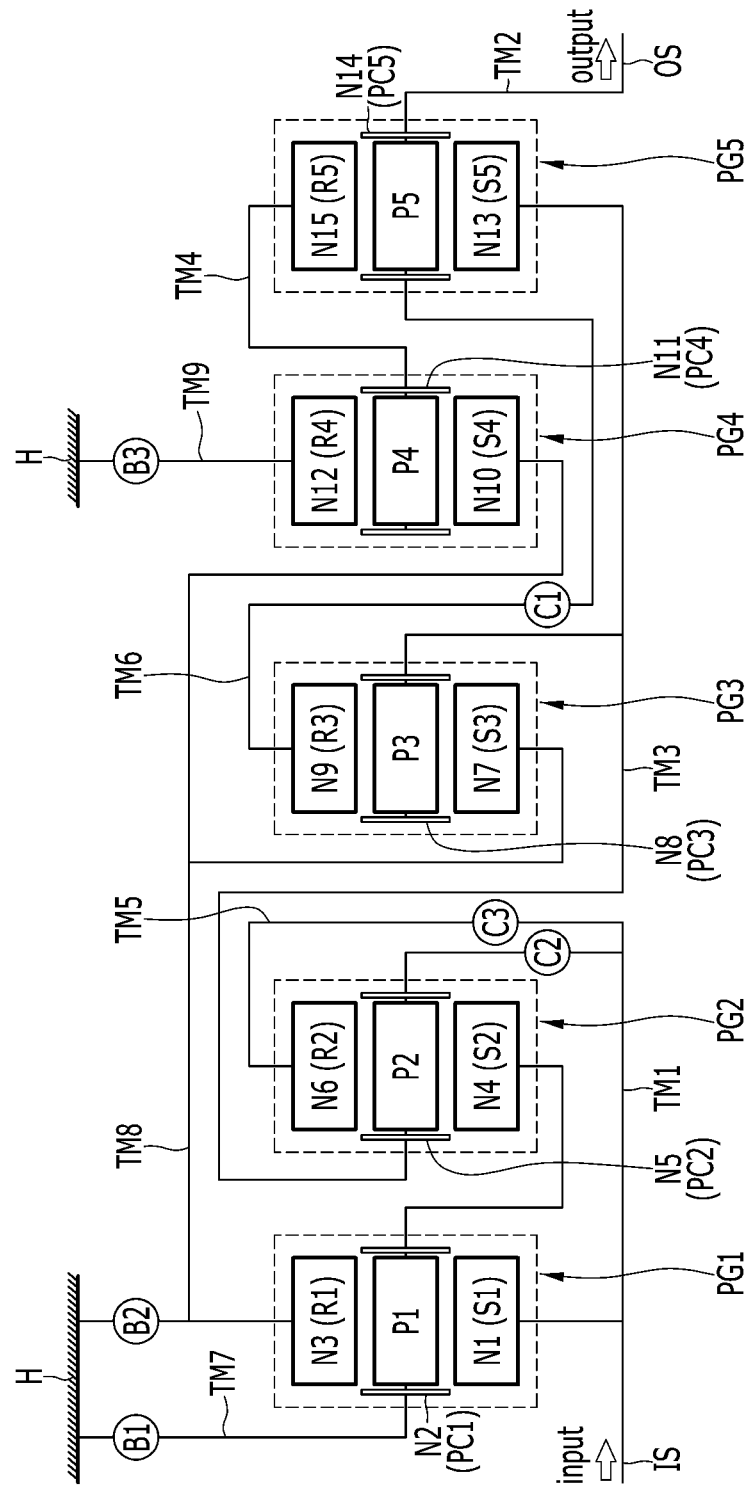
FIG. 1 is a schematic diagram of a planetary gear train according to the first exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

However, parts which are not related with the description are omitted for clearly describing the exemplary forms of the present disclosure and like reference numerals refer to like or similar elements throughout the present disclosure.

In the following description, dividing names of components into first, second, and the like is to divide the names because the names of the components are the same as each other and an order thereof is not particularly limited.

In the following description, various members are described as being connected, which may include members that are directly connected, fixedly connected, selectively connected or operably connected. In the drawings, various members are shown as being directly connected for movement together, and thus includes members that are fixedly connected. Herein, the term "fixedly connected" or the like means at least two members that are connected to each other to always rotate together. When two or more members are described to be "selectively connected" by an engagement element, it means that the selectively connected member rotate separately when the engagement element is not engaged, and rotate together at a same speed when the engagement element is engaged. Therefore, it is to be understood by a person of an ordinary skill in the art that the term "fixedly connected" or the like differs from the terms "operably connected", "selectively connected" or the like.

FIG. 1 is a schematic diagram of a planetary gear train according to the first exemplary form of the present disclosure.

Referring to FIG. 1, a planetary gear train includes: first, second, third, fourth, and fifth planetary gear sets PG1, PG2, PG3, PG4, and PG5 disposed on the same axis, an input shaft IS, an output shaft OS, nine shafts (i.e., TM1, TM2, TM3, TM4, TM5, TM6, TM7, TM8 and TM9) connected to at least one rotation element of the first, second, third, fourth, and fifth planetary gear sets PG1, PG2, PG3, PG4, and PG5, engaging elements including three clutches C1, C2, C3 and three brakes B1, B2, B3, and a transmission housing H.

Torque input from an engine to the input shaft IS is changed by cooperation of the first, second, third, fourth, and fifth planetary gear sets PG1, PG2, PG3, PG4, and PG5, and the changed torque is output through the output shaft OS.

According to the first exemplary form of the present disclosure, the planetary gear sets are disposed in a sequence of the first, second, third, fourth, and fifth planetary gear sets PG1, PG2, PG3, PG4, and PG5 from an engine side.

The input shaft IS is an input member and torque from a crankshaft of the engine is torque-converted through a torque converter to be input into the input shaft IS.

The output shaft OS is an output member, is disposed on the same axis with the input shaft IS, and transmits driving torque to a driving wheel through a differential apparatus.

The first planetary gear set PG1 is a single pinion planetary gear set and includes a first sun gear S1 of a first rotation element N1, a first planet carrier PC1 of a second rotation element N2 rotatably supporting a plurality of first pinion gears P1 evenly disposed on and externally engaged with an exterior circumference of the first sun gear S1, and a first ring gear R1 of a third rotation element N3 internally engaged with the plurality of first pinion gears P1 and operably connected with the first sun gear S1.

The second planetary gear set PG2 is a single pinion planetary gear set and includes a second sun gear S2 of a fourth rotation element N4, a second planet carrier PC2 of a fifth rotation element N5 rotatably supporting a plurality of second pinion gears P2 evenly disposed on and externally engaged with an exterior circumference of the second sun gear S2, and a second ring gear R2 of a sixth rotation element N6 internally engaged with the plurality of second pinion gears P2 and operably connected with the second sun gear S2.

The third planetary gear set PG3 is a single pinion planetary gear set and includes a third sun gear S3 of a seventh rotation element N7, a third planet carrier PC3 of an eighth rotation element N8 rotatably supporting a plurality of third pinion gears P3 evenly disposed on and externally engaged with an exterior circumference of the third sun gear S3, and a third ring gear R3 of a ninth rotation element N9 internally engaged with the plurality of third pinion gears P3 and operably connected with the third sun gear S3.

The fourth planetary gear set PG4 is a single pinion planetary gear set and includes a fourth sun gear S4 of a tenth rotation element N10, a fourth planet carrier PC4 of an eleventh rotation element N11 rotatably supporting a plurality of fourth pinion gears P4 evenly disposed on and externally engaged with an exterior circumference of the fourth sun gear S4, and a fourth ring gear R4 of a twelfth rotation element N12 internally engaged with the plurality of fourth pinion gears P4 and operably connected with the fourth sun gear S4.

The fifth planetary gear set PG5 is a single pinion planetary gear set and includes a fifth sun gear S5 of a thirteenth rotation element N13, a fifth planet carrier PC5 of a fourteenth rotation element N14 rotatably supporting a plurality of fifth pinion gears P5 evenly disposed on and externally engaged with an exterior circumference of the fifth sun gear S5, and a fifth ring gear R5 of a fifteenth rotation element N15 internally engaged with the plurality of fifth pinion gears P5 and operably connected with the fifth sun gear S5.

The second rotation element N2 is fixedly connected to the fourth rotation element N4, the third rotation element N3 is fixedly connected to the seventh rotation element N7 and the tenth rotation element N10, the fifth rotation element N5 is fixedly connected to the eighth rotation element N8 and the thirteenth rotation element N13, and the eleventh rotation element N11 is fixedly connected to the fifteenth rotation element N15 such that the first, second, third, fourth, and fifth planetary gear sets PG1, PG2, PG3, PG4, and PG5 include nine shafts TM1 to TM9.

The nine shafts TM1 to TM9 will be described in further detail.

The nine shafts TM1 to TM9 directly connects a plurality of rotation elements among the rotation elements of the planetary gear sets PG1, PG2, PG3, PG4, and PG5 with each other. The nine shafts are rotation members that are connected to any one rotation element and rotate with the any one rotation element to transmit torque, and that selectively connects any one rotation element with the transmission housing H, or are fixed members that directly connect any one rotation element to the transmission housing H.

The first shaft TM1 is fixedly connected to the first rotation element N1 (first sun gear S1) and is fixedly connected to the input shaft IS to be continuously operated as an input element.

The second shaft TM2 is connected to the fourteenth rotation element N14 (fifth planet carrier PC5) and preferably is fixedly connected thereto. The second shaft TM2 is fixedly connected to the output shaft OS to be continuously operated as an output element.

The third shaft TM3 is connected to the fifth rotation element N5 (second planet carrier PC2), the eighth rotation element N8 (third planet carrier PC3), and the thirteenth rotation element N13 (fifth sun gear S5), and preferably is fixedly connected thereto.

The fourth shaft TM4 is connected to the eleventh rotation element N11 (fourth planet carrier PC4) and the fifteenth rotation element N15 (fifth ring gear R5), and preferably is fixedly connected these elements.

The fifth shaft TM5 is connected to the sixth rotation element N6 (second ring gear R2), and preferably is fixedly connected thereto.

The sixth shaft TM6 is connected to the ninth rotation element N9 (third ring gear R3), and preferably is fixedly connected thereto.

The seventh shaft TM7 is connected to the second rotation element N2 (first planet carrier PC1) and the fourth rotation element N4 (second sun gear S2), and preferably is fixedly connected these elements.

The eighth shaft TM8 is connected to the third rotation element N3 (first ring gear R1), the seventh rotation element N7 (third sun gear S3), and the tenth rotation element N10 (fourth sun gear S4), and preferably is fixedly connected these elements.

The ninth shaft TM9 is connected to the twelfth rotation element N12 (fourth ring gear R4), and preferably is fixedly connected thereto.

Herein, the second shaft TM2 is selectively connected to the sixth shaft TM6, and each of the third shaft TM3 and the fifth shaft TM5 is selectively connected to the first shaft TM1.

In addition, each of the seventh shaft TM7, the eighth shaft TM8, and the ninth shaft TM9 is selectively connected to the transmission housing H to be operated as a selective fixed element.

Three clutches C1, C2, and C3 that are engaging elements are disposed at portions at which any two shafts among the nine shafts TM1 to TM9 including the input shaft IS and the output shaft OS are selectively connected with each other.

In addition, three brakes B1, B2, and B3 that are engaging elements are disposed at portions at which any one shaft among the nine shafts TM1 to TM9 is selectively connected with the transmission housing H.

Arrangement of the six engaging elements (three clutches C1 to C3 and three brakes B1 to B3) will be described in detail.

The first clutch C1 is disposed between the second shaft TM2 and the sixth shaft TM6 and selectively connects the second shaft TM2 to the sixth shaft TM6.

The second clutch C2 is disposed between the first shaft TM1 and the third shaft TM3 and selectively connects the first shaft TM1 to the third shaft TM3.

The third clutch C3 is disposed between the first shaft TM1 and the fifth shaft TM5 and selectively connects the first shaft TM1 to the fifth shaft TM5.

The first brake B1 is disposed between the seventh shaft TM7 and the transmission housing H and selectively connects and fixes the seventh shaft TM7 to the transmission housing H.

The second brake B2 is disposed between the eighth shaft TM8 and the transmission housing H and selectively connects and fixes the eighth shaft TM8 to the transmission housing H.

The third brake B3 is disposed between the ninth shaft TM9 and the transmission housing H and selectively connects and fixes the ninth shaft TM9 to the transmission housing H.

It is illustrated in FIG. 1 that the second clutch C2 and the third clutch C3 selectively connect the third shaft TM3 and the fifth shaft TM5 to the first shaft TM1, respectively. Since the first shaft TM1 is fixedly connected to the input shaft IS, however, the second clutch C2 may connect the input shaft IS to the third shaft TM3 and the third clutch C3 may connect the input shaft IS to the fifth shaft TM5.

The engaging elements including the first, second, and third clutches C1, C2, and C3 and the first, second, and third brakes B1, B2, and B3 may be multi-plates friction elements of wet type that are operated by hydraulic pressure. Multi-plates friction elements of wet type are mainly used as the engaging elements, but dog clutches, electric clutches, or magnetic clutches that can be operated by electric signal from an electric control unit can be used as the engaging elements.

FIG. 2 is an operation chart of engaging elements at each speed stage in the planetary gear train according to the first exemplary form of the present disclosure.

Referring to FIG. 2, three combinations of the first, second, and third clutches C1, C2, and C3 and the first, second, and third brakes B1, B2, and B3 are operated at each speed stage in the planetary gear train.

The third clutch C3 and the first and third brakes B1 and B3 are operated at a first forward speed stage D1.

When the first shaft TM1 is connected to the fifth shaft TM5 by operation of the third clutch C3, torque of the input shaft IS is input to the first and fifth shafts TM1 and TM5.

At this state, the seventh and ninth shafts TM7 and TM9 are operated as the fixed elements by operation of the first and third brakes B1 and B3. Therefore, the torque of the input shaft IS is shifted into the first forward speed stage, and the first forward speed stage is output through the output shaft OS connected to the second shaft TM2.

The second clutch C2 and the first and third brakes B1 and B3 are operated at a second forward speed stage D2.

When the first shaft TM1 is connected to the third shaft TM3 by operation of the second clutch C2, the torque of the input shaft IS is input to the first and third shafts TM1 and TM3.

At this state, the seventh and ninth shafts TM7 and TM9 are operated as the fixed elements by operation of the first and third brakes B1 and B3. Therefore, the torque of the input shaft IS is shifted into the second forward speed stage, and the second forward speed stage is output through the output shaft OS connected to the second shaft TM2.

The second clutch C2 and the second and third brakes B2 and B3 are operated at a third forward speed stage D3.

When the first shaft TM1 is connected to the third shaft TM3 by operation of the second clutch C2, the torque of the input shaft IS is input to the first and third shafts TM1 and TM3.

At this state, the eighth and ninth shafts TM8 and TM9 are operated as the fixed elements by operation of the second and third brakes B2 and B3. Therefore, the torque of the input shaft IS is shifted into the third forward speed stage, and the third forward speed stage is output through the output shaft OS connected to the second shaft TM2.

The second and third clutches C2 and C3 and the third brake B3 are operated at a fourth forward speed stage D4.

When the first shaft TM1 is connected to the third shaft TM3 by operation of the second clutch C2 and the first shaft TM1 is connected to the fifth shaft TM5 by operation of the third clutch C3, the torque of the input shaft IS is input to the first, third, and fifth shafts TM1, TM3, and TM5.

At this state, the ninth shaft TM9 is operated as the fixed element by operation of the third brake B3. Therefore, the torque of the input shaft IS is shifted into the fourth forward speed stage, and the fourth forward speed stage is output through the output shaft OS connected to the second shaft TM2.

The first and second clutches C1 and C2 and the third brake B3 are operated at a fifth forward speed stage D5.

When the second shaft TM2 is connected to the sixth shaft TM6 by operation of the first clutch C1 and the first shaft TM1 is connected to the third shaft TM3 by operation of the second clutch C2, the torque of the input shaft IS is input to the first and third shafts TM1 and TM3.

At this state, the ninth shaft TM9 is operated as the fixed element by operation of the third brake B3. Therefore, the torque of the input shaft IS is shifted into the fifth forward speed stage, and the fifth forward speed stage is output through the output shaft OS connected to the second shaft TM2.

The first and third clutches C1 and C3 and the third brake B3 are operated at a sixth forward speed stage D6.

When the second shaft TM2 is connected to the sixth shaft TM6 by operation of the first clutch C1 and the first shaft TM1 is connected to the fifth shaft TM5 by operation of the third clutch C3, the torque of the input shaft IS is input to the first and fifth shafts TM1 and TM5.

At this state, the ninth shaft TM9 is operated as the fixed element by operation of the third brake B3. Therefore, the torque of the input shaft IS is shifted into the sixth forward speed stage, and the sixth forward speed stage is output through the output shaft OS connected to the second shaft TM2.

The first, second, and third clutches C1, C2, and C3 are operated at a seventh forward speed stage D7.

When the second shaft TM2 is connected to the sixth shaft TM6 by operation of the first clutch C1, the first shaft TM1 is connected to the third shaft TM3 by operation of the second clutch C2, and the first shaft TM1 is connected to the fifth shaft TM5 by operation of the third clutch C3, the torque of the input shaft IS is input to the first, third, and fifth shafts TM1, TM3, and TM5.

In this case, the first, second, third, fourth, and fifth planetary gear sets PG1, PG2, PG3, PG4, and PG5 become lock-up states. Therefore, the torque of the input shaft IS is output through the output shaft OS connected with the second shaft TM2 without speed change.

The first and third clutches C1 and C3 and the second brake B2 are operated at an eighth forward speed stage D8.

When the second shaft TM2 is connected to the sixth shaft TM6 by operation of the first clutch C1 and the first shaft TM1 is connected to the fifth shaft TM5 by operation of the third clutch C3, the torque of the input shaft IS is input to the first and fifth shafts TM1 and TM5.

At this state, the eighth shaft TM8 is operated as the fixed element by operation of the second brake B2. Therefore, the torque of the input shaft IS is shifted into the eighth forward speed stage, and the eighth forward speed stage is output through the output shaft OS connected to the second shaft TM2.

The first and second clutches C1 and C2 and the second brake B2 are operated at a ninth forward speed stage D9.

When the second shaft TM2 is connected to the sixth shaft TM6 by operation of the first clutch C1 and the first shaft TM1 is connected to the third shaft TM3 by operation of the second clutch C2, the torque of the input shaft IS is input to the first and third shafts TM1 and TM3.

At this state, the eighth shaft TM8 is operated as the fixed element by operation of the second brake B2. Therefore, the torque of the input shaft IS is shifted into the ninth forward speed stage, and the ninth forward speed stage is output through the output shaft OS connected to the second shaft TM2.

The first and second clutches C1 and C2 and the first brake B1 are operated at a tenth forward speed stage D10.

When the second shaft TM2 is connected to the sixth shaft TM6 by operation of the first clutch C1 and the first shaft TM1 is connected to the third shaft TM3 by operation of the second clutch C2, the torque of the input shaft IS is input to the first and third shafts TM1 and TM3.

At this state, the seventh shaft TM7 is operated as the fixed element by operation of the first brake B1. Therefore, the torque of the input shaft IS is shifted into the tenth forward speed stage, and the tenth forward speed stage is output through the output shaft OS connected to the second shaft TM2.

The first clutch C1 and the first and third brakes B1 and B3 are operated at a reverse speed stage REV1.

When the second shaft TM2 is connected to the sixth shaft TM6 by operation of the first clutch C1, the torque of the input shaft IS is input to the first shaft TM1.

At this state, the seventh and ninth shafts TM7 and TM9 are operated as the fixed elements by operation of the first and third brakes B1 and B3. Therefore, the torque of the input shaft IS is shifted into the reverse speed stage, and the reverse speed stage is output through the output shaft OS connected to the second shaft TM2.

Figure 3:
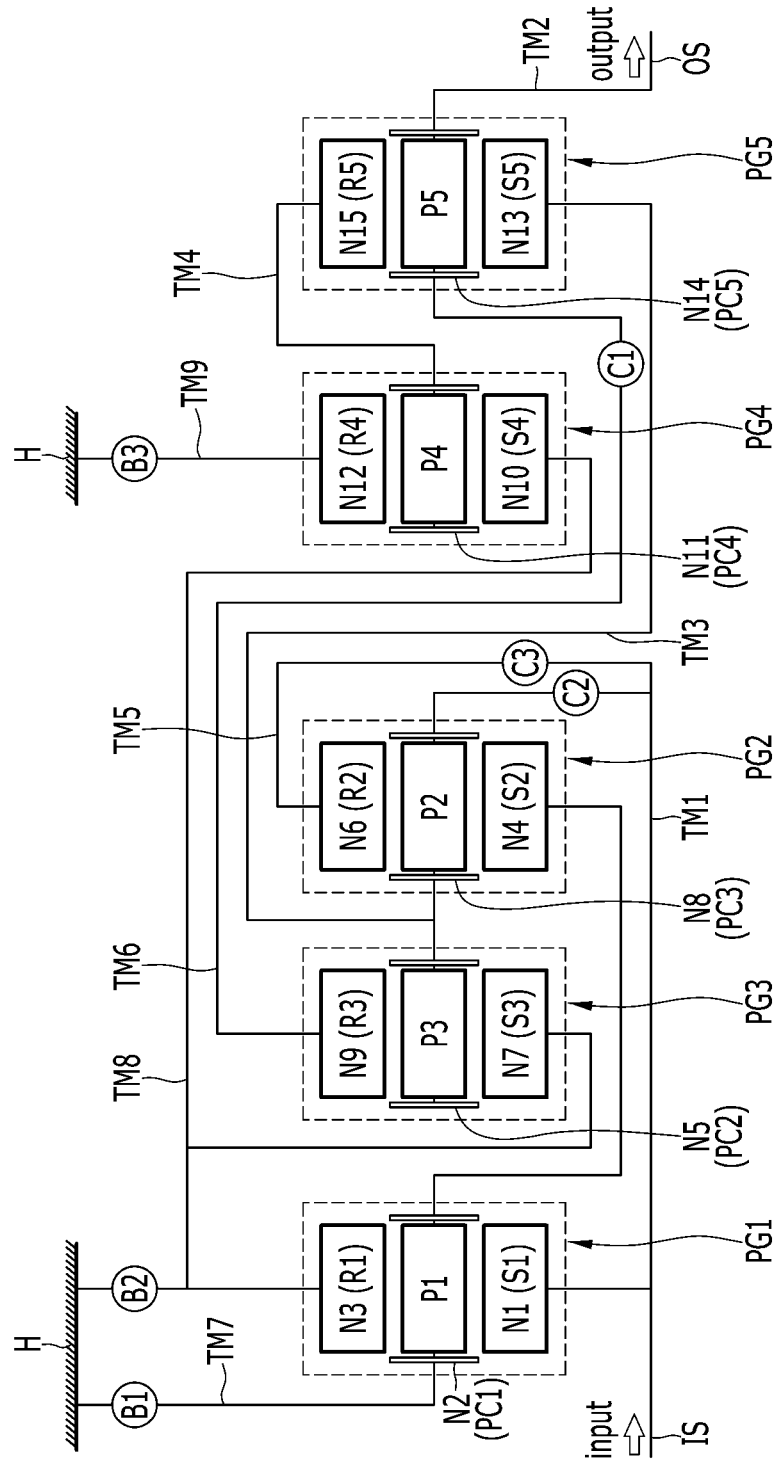
FIG. 3 is a schematic diagram of a planetary gear train according to the second exemplary form of the present disclosure.

FIG. 3 is a schematic diagram of a planetary gear train according to the second exemplary form of the present disclosure.

Referring to FIG. 1, the planetary gear sets are disposed in a sequence of the first, second, third, fourth, and fifth planetary gear sets PG1, PG2, PG3, PG4, and PG5 from the engine side in the planetary gear train according to the first exemplary form of the present disclosure. As shown in FIG. 3, however, the planetary gear sets are disposed in a sequence of the first, third, second, fourth, and fifth planetary gear sets PG1, PG3, PG2, PG4, and PG5 from the engine side in a planetary gear train according to the second exemplary form of the present disclosure.

Connections of nine shafts TM1 to TM9, three clutches C1 to C3, and three brakes B1 to B3 according to the second exemplary form are the same as those according to the first exemplary form. Therefore, operation and effect of the planetary gear train according to the second exemplary form are the same as those according to the first exemplary form.

According to the first and second exemplary forms of the present disclosure, ten forward speed stages and one reverse speed stage may be achieved by using five planetary gear sets PG1, PG2, PG3, PG4, and PG5 and six engaging elements including three clutches C1, C2, and C3 and three brakes B1, B2, and B3.

In addition, since gear ratio span greater than 10.9 is secured, driving efficiency of the engine may be increased. In addition, since linearity of step ratios can be secured due to multiple speed stages, drivability such as acceleration before and after shift, rhythmical engine speed, and so on may be improved.

In addition, since ten forward speed stages and one reverse speed stage are achieved by using the reduced number of engaging elements, drag loss of clutches and brakes may be reduced and power delivery efficiency and fuel economy may be improved.

In addition, since a planetary gear set of an output side in torque parallel type is used and torque is evenly shared to each planetary gear set and each engaging element, torque delivery efficiency and durability may be improved.

In addition, since five planetary gear sets are used to achieve ten forward speed stages and one reverse speed stage, flexibility of output gear ratios may be increased and linearity of step ratios may be improved.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

PG1, PG2, PG3, PG4, PG5: first, second, third, fourth, and fifth planetary gear sets
S1, S2, S3, S4, S5: first, second, third, fourth, and fifth sun gears
PC1, PC2, PC3, PC4, PC5: first, second, third, fourth, and fifth planet carriers
R1, R2, R3, R4, R5: first, second, third, fourth, and fifth ring gears
C1, C2, C3: first, second, and third clutches
B1, B2, B3: first, second, and third brakes
IS: input shaft
OS: output shaft
TM1, TM2, TM3, TM4, TM5, TM6, TM7, TM8, TM9: first, second, third, fourth, fifth, sixth, seventh, and eighth, ninth shafts

What is claimed is:

1. A planetary gear train of an automatic transmission for a vehicle, the planetary gear train comprising:
    an input shaft configured to receive torque of an engine;
    an output shaft configured to output torque;
    a first planetary gear set including first, second, and third rotation elements;
    a second planetary gear set including fourth, fifth, and sixth rotation elements;
    a third planetary gear set including seventh, eighth, and ninth rotation elements;
    a fourth planetary gear set including tenth, eleventh, and twelfth rotation elements;
    a fifth planetary gear set including thirteenth, fourteenth, and fifteenth rotational elements;
    a first shaft fixedly connected to the first rotation element and the input shaft;
    a second shaft fixedly connected to the fourteenth rotation element and the output shaft;
    a third shaft fixedly connected to the fifth rotation element, the eighth rotation element, and the thirteenth rotation element;
    a fourth shaft fixedly connected to the eleventh rotation element and the fifteenth rotation element;
    a fifth shaft fixedly connected to the sixth rotation element;
    a sixth shaft fixedly connected to the ninth rotation element;
    a seventh shaft fixedly connected to the second rotation element and the fourth rotation element;
    an eighth shaft fixedly connected to the third rotation element, the seventh rotation element, and the tenth rotation element; and
    a ninth shaft fixedly connected to the twelfth rotation element.

2. The planetary gear train of claim 1, further comprising six engaging elements configured to selectively connect one shaft of the nine shafts with another shaft of the nine shafts or selectively connect at least one shaft of nine shafts with a transmission housing, wherein any one of forward speed stages or a reverse speed stage is achieved by operating any three combinations of the six engaging elements.

3. The planetary gear train of claim 2, wherein the six engaging elements comprise:

three clutches, each selectively connecting any two shafts among the nine shafts; and three brakes, each selectively connecting at least one shaft among the nine shafts that is not connected to the input shaft or the output shaft to the transmission housing.

4. The planetary gear train of claim 2, wherein the six engaging elements comprise:

a first clutch disposed between the second shaft and the sixth shaft;

a second clutch disposed between the first shaft and the third shaft;

a third clutch disposed between the first shaft and the fifth shaft;

a first brake disposed between the seventh shaft and the transmission housing;

a second brake disposed between the eighth shaft and the transmission housing; and a third brake disposed between the ninth shaft and the transmission housing.

5. The planetary gear train of claim 1, wherein the first rotation element is a first sun gear, the second rotation element is a first planet carrier, and the third rotation element is a first ring gear, the fourth rotation element is a second sun gear, the fifth rotation element is a second planet carrier, and the sixth rotation element is a second ring gear, the seventh rotation element is a third sun gear, the eighth rotation element is a third planet carrier, and the ninth rotation element is a third ring gear, the tenth rotation element is a fourth sun gear, the eleventh rotation element is a fourth planet carrier, and the twelfth rotation element is a fourth ring gear, and the thirteenth rotation element is a fifth sun gear, the fourteenth rotation element is a fifth planet carrier, and the fifteenth rotation element is a fifth ring gear.

6. The planetary gear train of claim 1, wherein the first, second, third, fourth, and fifth planetary gear sets are disposed in a sequence of the first, second, third, fourth, and fifth planetary gear sets from the engine side.

7. The planetary gear train of claim 1, wherein the first, second, third, fourth and fifth planetary gear sets are disposed in a sequence of the first, third, second, fourth and fifth planetary gear sets from the engine side.

8. A planetary gear train of an automatic transmission for a vehicle, the planetary gear train comprising:

an input shaft configured to receive torque of an engine;

an output shaft configured to output torque;

a first planetary gear set including first, second, and third rotation elements;

a second planetary gear set including fourth, fifth, and sixth rotation elements;

a third planetary gear set including seventh, eighth, and ninth rotation elements;

a fourth planetary gear set including tenth, eleventh, and twelfth rotation elements;

a fifth planetary gear set including thirteenth, fourteenth, and fifteenth rotational elements;

a first shaft fixedly connected to the first rotation element and the input shaft;

a second shaft fixedly connected to the fourteenth rotation element and the output shaft;

a third shaft fixedly connected to the fifth rotation element, the eighth rotation element, and the thirteenth rotation element;

a fourth shaft fixedly connected to the eleventh rotation element and the fifteenth rotation element;

a fifth shaft fixedly connected to the sixth rotation element;

a sixth shaft fixedly connected to the ninth rotation element; and a plurality of shafts selectively and respectively connected with a transmission housing while fixedly and respectively connected to at least one rotation element of remaining rotation elements of the first, second, third and fourth planetary gear sets that are not connected to the first, second, third, fourth, fifth and sixth shafts, wherein the plurality of shafts comprise:

a seventh shaft fixedly connected to the second rotation element and the fourth rotation element;

an eighth shaft fixedly connected to the third rotation element, the seventh rotation element, and the tenth rotation element; and a ninth shaft fixedly connected to the twelfth rotation element.

9. The planetary gear train of claim 8, further comprising:

three clutches, each connecting any two shafts among the nine shafts; and three brakes, each selectively connecting at least one shaft among the nine shafts that is not connected to the input shaft or the output shaft to the transmission housing.

10. The planetary gear train of claim 9, wherein the three clutches comprise:

a first clutch disposed between the second shaft and the sixth shaft;

a second clutch disposed between the first shaft and the third shaft; and a third clutch disposed between the first shaft and the fifth shaft, and wherein the three brakes comprise:

a first brake disposed between the seventh shaft and the transmission housing;

a second brake disposed between the eighth shaft and the transmission housing; and a third brake disposed between the ninth shaft and the transmission housing.

11. The planetary gear train of claim 8, wherein the first rotation element is a first sun gear, the second rotation element is a first planet carrier, and the third rotation element is a first ring gear, the fourth rotation element is a second sun gear, the fifth rotation element is a second planet carrier, and the sixth rotation element is a second ring gear, the seventh rotation element is a third sun gear, the eighth rotation element is a third planet carrier, and the ninth rotation element is a third ring gear, the tenth rotation element is a fourth sun gear, the eleventh rotation element is a fourth planet carrier, and the twelfth rotation element is a fourth ring gear, and the thirteenth rotation element is a fifth sun gear, the fourteenth rotation element is a fifth planet carrier, and the fifteenth rotation element is a fifth ring gear.

12. The planetary gear train of claim 8, wherein the first, second, third, fourth, and fifth planetary gear sets are disposed in a sequence of the first, second, third, fourth, and fifth planetary gear sets from the engine side.

13. The planetary gear train of claim 8, wherein the first, second, third, fourth, and fifth planetary gear sets are disposed in a sequence of the first, third, second, fourth, and fifth planetary gear sets from the engine side.

14. A planetary gear train of an automatic transmission for a vehicle, the planetary gear train comprising:
- an input shaft configured to receive torque of an engine;
- an output shaft configured to output torque;
- a first planetary gear set including first, second, and third rotation elements;
- a second planetary gear set including fourth, fifth, and sixth rotation elements;
- a third planetary gear set including seventh, eighth, and ninth rotation elements;
- a fourth planetary gear set including tenth, eleventh, and twelfth rotation elements;
- a fifth planetary gear set including thirteenth, fourteenth, and fifteenth rotational elements;
- a first shaft fixedly connected to the first rotation element and the input shaft;
- a second shaft fixedly connected to the fourteenth rotation element and the output shaft;
- a third shaft fixedly connected to the fifth rotation element, the eighth rotation element, and the thirteenth rotation element;
- a fourth shaft fixedly connected to the eleventh rotation element and the fifteenth rotation element;
- a fifth shaft fixedly connected to the sixth rotation element;
- a sixth shaft fixedly connected to the ninth rotation element; and
- seventh, eighth, and ninth shafts, each configured to selectively connected with a transmission housing via at least one of brakes while fixedly connected with at least one rotation element of remaining rotation elements of the first, second, third and fourth planetary gear sets that are not connected to the first, second, third, fourth, fifth and sixth shafts,
- wherein the second shaft and the sixth shaft, the first shaft and the third shaft, and the first shaft and the fifth shaft are selectively and respectively connected to each other via at least one of clutches,
- the seventh shaft is fixedly connected to the second rotation element and the fourth rotation element,
- the eighth shaft is fixedly connected to the third rotation element, the seventh rotation element, and the tenth rotation element, and
- the ninth shaft is fixedly connected to the twelfth rotation element.

15. The planetary gear train of claim 14, wherein the clutches comprise:
- a first clutch disposed between the second shaft and the sixth shaft;
- a second clutch disposed between the first shaft and the third shaft; and
- a third clutch disposed between the first shaft and the fifth shaft, and wherein the brakes comprise:
- a first brake disposed between the seventh shaft and the transmission housing;
- a second brake disposed between the eighth shaft and the transmission housing; and
- a third brake disposed between the ninth shaft and the transmission housing.

16. The planetary gear train of claim 14, wherein the first rotation element is a first sun gear, the second rotation element is a first planet carrier, and the third rotation element is a first ring gear,
- the fourth rotation element is a second sun gear, the fifth rotation element is a second planet carrier, and the sixth rotation element is a second ring gear,
- the seventh rotation element is a third sun gear, the eighth rotation element is a third planet carrier, and the ninth rotation element is a third ring gear,
- the tenth rotation element is a fourth sun gear, the eleventh rotation element is a fourth planet carrier, and the twelfth rotation element is a fourth ring gear, and
- the thirteenth rotation element is a fifth sun gear, the fourteenth rotation element is a fifth planet carrier, and the fifteenth rotation element is a fifth ring gear.

17. The planetary gear train of claim 14, wherein the first, second, third, fourth, and fifth planetary gear sets are disposed in a sequence of the first, second, third, fourth, and fifth planetary gear sets from the engine side.

18. The planetary gear train of claim 14, wherein the first, second, third, fourth, and fifth planetary gear sets are disposed in a sequence of the first, third, second, fourth, and fifth planetary gear sets from the engine side.

* * * * *